Inventor
W. J. Lindsay
By his attorney
F. R. Squair.

March 5, 1929. W. J. LINDSAY 1,704,483
PROCESS OF CALCINING LITHOPONE
Filed Sept. 21, 1921   2 Sheets-Sheet 2

W. J. Lindsay, Inventor

By his attorney

Patented Mar. 5, 1929.

1,704,483

UNITED STATES PATENT OFFICE.

WILLIAM J. LINDSAY, OF NORWOOD, PENNSYLVANIA, ASSIGNOR TO E. I. DU PONT DE NEMOURS & COMPANY, OF WILMINGTON, DELAWARE, A CORPORATION OF DELAWARE.

PROCESS OF CALCINING LITHOPONE.

Application filed September 21, 1921. Serial No. 502,101.

This invention relates to the manufacture of lithopone and, more particularly, it relates to a process of calcining lithopone such as to make feasible the use of desirable apparatus.

In the manufacture of lithopone one of the important steps is the calcination of the pigment. This is the heating of the "raw", previously filtered, and at least partially dried lithopone, a precipitated mixture of zinc sulphide and barium sulphate, until it is perceptibly red (the color first appears below 600° C.). By the calcination, the tinting strength of the pigment is increased and its oil absorption decreased. (After the proper temperature has been reached in the calcination the pigment is quenched in water.)

For the production of a proper pigment, it is highly important that the zinc sulphide be not oxidized (to zinc sulphate or zinc oxide) and therefore access of oxygen to the pigment during the calcination must be prevented. Also, the pigment must be properly stirred or agitated during the calcination, in order to properly and uniformly heat it, as is evident. And from an operating standpoint, a continuous type of calcining furnace is highly desirable; the continuous, rotary horizontal furnace recommending itself as combining the features of continuous feed, travel, and discharge, and suitable agitation.

But the difficulty is that, except for the present invention, a continuous rotary furnace is not practically usable. Such a furnace cannot be externally heated to the temperatures required in lithopone calcination since the heavy and horizontally disposed iron shell, when exposed to the direct application of the heat, rapidly deteriorates, warps, and so on, while an exterior protective layer of tile or the like is not practical because of the great heat losses it entails. On the other hand, internal heating has not appeared practicable because of the necessity of excluding oxygen. Now I have devised a process of calcining lithopone which can be practiced with, and permits of the use of, a rotary continuous horizontal furnace, with internal heating and exclusion of oxygen; and I have also devised a furnace for the practice of such process.

Briefly stated, the invention includes heating the lithopone by the direct application thereto of hot gases which do not contain free oxygen, the heating being carried on in a furnace so constructed as to exclude air, so that, in practical effect, the lithopone is heated by, and in the presence of, an atmosphere containing no free oxygen and, hence, incapable of oxidizing the zinc sulphide. Working in this way, it will be seen that I can heat a furnace internally and at the same time exclude oxygen, making wholly feasible the use of a continuous rotary horizontal furnace. Furthermore, by the direct application of the heat I avoid all those heat losses which, because of the type, occur in any furnace wherein a wall is disposed between the heating gases and the material to be heated; and yet, as will more fully appear hereinafter, I also avoid the contamination of the product, by dust, carbon etc., which would occur in a grate-fired furnace, while at the same time I maintain the oxygen-free atmosphere which might seem obtainable in a walled furnace with its wall taking a form to provide a lithopone chamber sealed against the admission of oxygen (air).

Without restricting it thereto I describe the invention with more particular reference to the apparatus illustrated in the accompanying drawings, and embodying it as it relates to apparatus.

In these drawings:—

Figure 1:
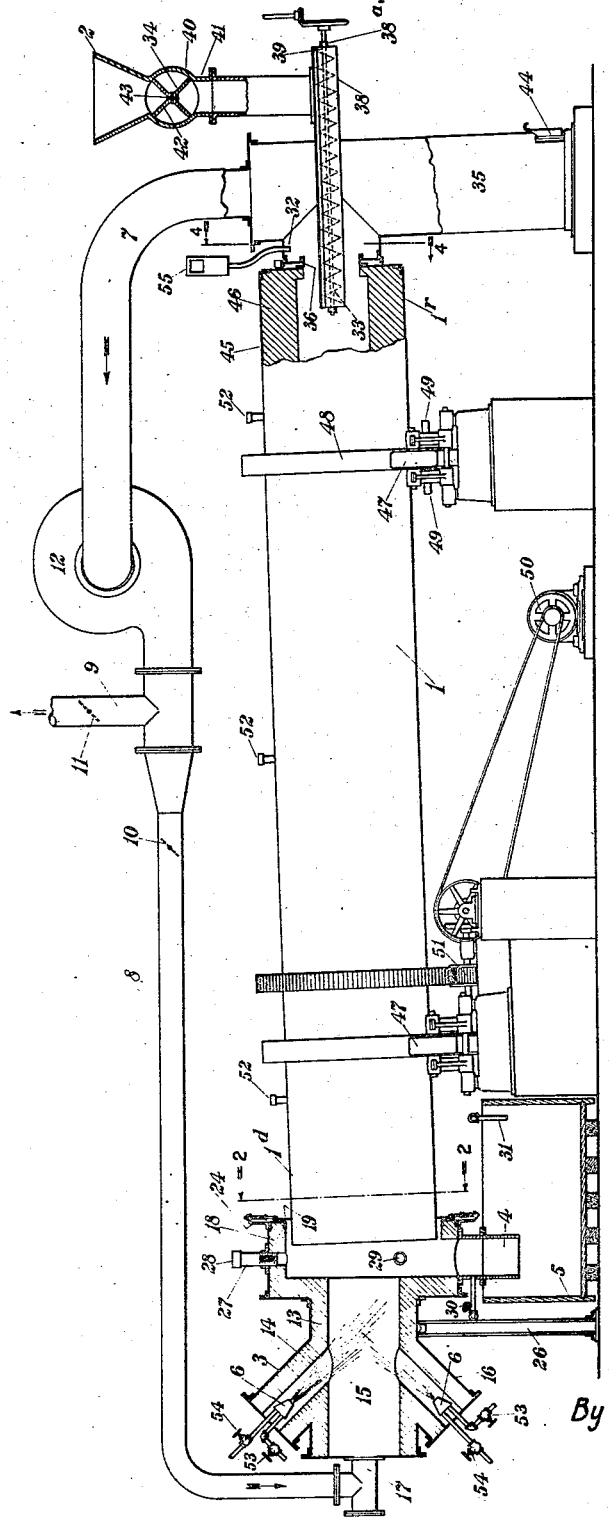
Figure 1 is substantially a diametrical longitudinal sectional view of a continuous rotary horizontal furnace.

Referring now to the drawings, the illustrated furnace comprises a kiln proper 1 in the general character of cylindrical shell, located in a generally horizontal position, but inclined somewhat downward from right to left (as the same is illustrated in Figure 1) to provide for travel of the lithopone therealong, and mounted for rotation about its longitudinal axis. At one of its ends, $1^r$, the kiln 1 is connected, in such manner as to practically exclude air while permitting relative rotative movement, with a structure for continuously feeding raw lithopone to the kiln while preventing admission of air, and designated generally as 2. At its other end, $1^d$, the kiln is similarly connected to a combustion-chamber structure designated generally as 3. A discharge pipe 4, water sealed by the projection of its open end into the water contained in a tank 5, provides for the discharge of the calcined lithopone from the kiln. It will be seen that the structure provides for the exclusion of air from the lithopone from the time it is fed into the furnace until after it is cooled. The combustion chamber structure is provided with gas burners 6, 6, shown as broadly of the two-pipe-system type (air and gas supplied under pressure) and, so, permitting accurate adjustment of the air and gas supplies. The structure 2 is provided with an exit pipe 7 for the escape of the products of combustion. With this arrangement the lithopone enters the kiln at the end $1^r$, travels the length thereof, being agitated during the travel by the rotation of the kiln, and discharges at 4, while the hot combustion gases oppositely travel in direct contact with the lithopone and heat the same as required.

In operating in accordance with the process, the supplies of gas and air are so regulated that there is no oxygen supplied in excess of that required to be actually consumed in combustion—preferably, indeed, the supply is such that the combustion gases contain free carbon monoxide, say ½ to 1½%. The furnace connections being, as before indicated, air tight, it will be seen that the calcination is carried on in the absence of free oxygen, the lithopone being heated in an atmosphere comprising no free oxygen, directly by that atmosphere. Thus the process provides for the use of a rotary horizontal kiln, with its advantage of continuous treatment, since it eliminates all difficulties which would arise were it attempted to heat the contents of such a kiln indirectly, i. e., by the application of heating gases to the exterior thereof; and, at the same time, also eliminates the possibility of oxidation of the lithopone.

The gas above mentioned may be ordinary city gas (that is, an enriched water gas) containing substantial quantities of both hydrogen and carbon monoxide. A typical gas of this kind has the following composition, Philadelphia city gas being used by way of example:

|  | Per cent by volume. |
|---|---|
| Hydrogen | 37.4 |
| Methane | 16.2 |
| Carbon monoxide | 25.8 |
| Carbon dioxide | 5.4 |
| Oxygen | 0.8 |
| Nitrogen | 5.9 |
| Mixture of 50% $C_2H_4$ and 50% $C_3H_6$ | 8.5 |
|  | 100.0 |

In carrying out the process the heating conditions are preferably maintained such, and the lithopone fed through the furnace at such a rate, that the lithopone is held at a red heat (i. e. above 600° C.) for fifteen minutes or more.

With gas heating, it is of course desirable to use those gases which are readily obtainable, such as city gas or producer gas; but the flame temperatures of such gases are so high, say 1500° C. as to give temperatures uncalled for in the calcination. In the present apparatus means are provided for overcoming this difficulty while avoiding the admission of air (oxygen) to the kiln. The exit pipe 7 for the gases resulting from the combustion is provided with an extension 8 communicating with the combustion structure 3 as is shown in Figure 1, and leading from the pipe 7 adjacent the primary escape 9 thereof. Valves or dampers 10 and 11 in the pipes 8 and 9 provide for the adjusting of the amount of gases returned to the system. In operation, such volume of gases as is necessary for proper cooling is circulated through the system, the gases entering the combustion chamber through pipe 8 of course being cooler than the gases immediately after combustion. These returned gases of course contain no oxygen. The gases passing to the stack will of course be equal in quantity to the gases formed by the combustion, and the circulating gases may be considered as an amount taken, at some time, from the stack gases and repeatedly circulated through the system.

Desirably a blower fan 12, driven in a direction to move the gases as above indicated, is inserted in the pipe 7. Thus not only is the desired circulation promoted, and the gases drawn from the kiln, but a slight pressure, for example approximately two hundredths of an inch of water at the feed end of the kiln, is maintained, thereby obviating possible slight air leakage into the kiln at the connections between the kiln and the structures 2 and 3 and so on.

The combustion chamber structure 3 (desirably of fire brick 13 faced with steel 14) presents the combustion chamber proper 15. The burners 6, in any suitable number, are mounted in chamber extensions 16 and, as before indicated, the pipe 8 is connected with the rear of the chamber at 17.

Figure 2:
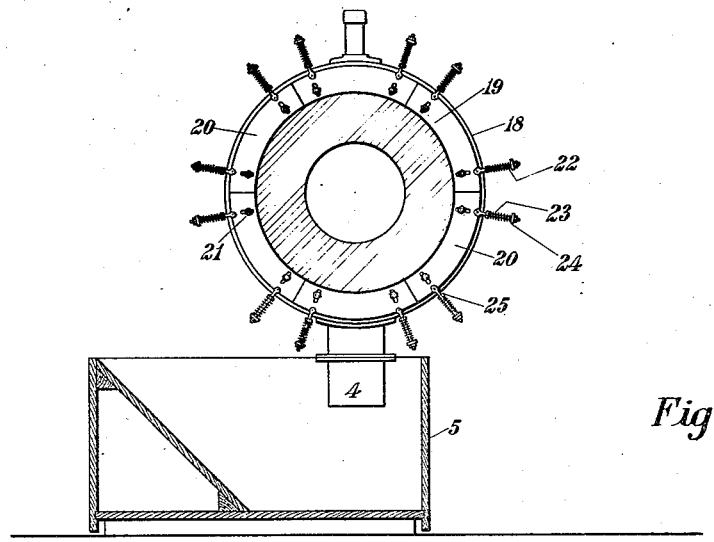
Figure 2 is a cross-sectional view taken substantially on the line 2—2 of Figure 1, looking in the direction of the arrows.

At its forward, or kiln-connected, end the chamber structure 3 has provisions for substantially air tight connection with the kiln. As shown, the structure is provided with an annular overhanging portion 18 for receiving and closely surrounding the open end $1^d$ of the cylindrical kiln. To prevent air leakage, a closure, designated generally as 19, is mounted upon the forward edge of the portion 18. This desirably comprises (Fig. 2) a plurality of segments 20 contoured to mate the kiln and slidably connected, by the stud bolts 21, to the face of the portion 18 to be shiftable toward and from the kiln. Conveniently, and as shown, the segments are urged into the contact with the kiln by springs 22 each surrounding a rod 23 slidably carried in the bracket 24 (on the portion 18) and connected to the segment, the spring expanding between the bracket and nut 25 on the rod. The chamber structure is conveniently carried on the steel column 26 secured to the floor and the structure.

The before mentioned discharge pipe 4 for calcined lithopone is connected with the portion 18 as shown and, desirably, a poke hole 27 with a removable cap 28 is provided substantially opposite the pipe 4. If desired a mica covered peep hole 29, with a suitable cover, may also be provided. Pipes 30 and 31 provide for the introducing of water to, and withdrawal of the same from, the tank 5.

Figure 3:
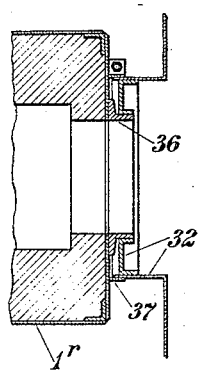
Figure 3 is a fragmental sectional view of the receiving end of the kiln to a somewhat larger scale than Figure 1.
Figure 5:
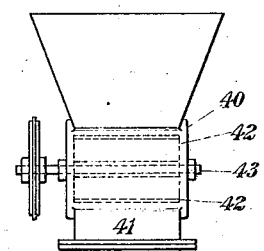
Figure 5 is a partial end view of the furnace, showing the feeding provisions.
Figure 4:
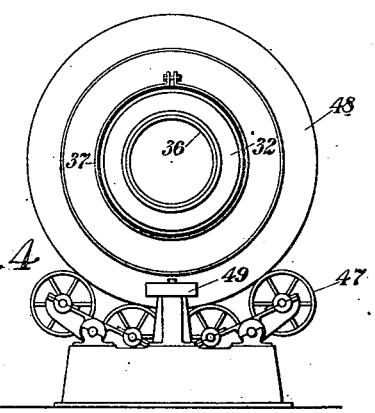
Figure 4 is a view taken substantially at line 4—4 of Figure 1, looking in the direction of the arrows, but with the screw-feed device omitted.

The feeding structure 2 is, conveniently, of steel. The structure includes, in addition to an annular extension or flue portion 32 (Fig. 3) for immediate cooperation with the end $1^r$ of the kiln (thereby to establish the connection of the kiln with the pipe 7), a feeding device designated generally as 33 and 34 and a dust collector 35. To give practically air-tight connection between the portion 32 and the end $1^r$ of the kiln such end is provided with an annular extension or portion 36 closely (but rotatably) receivable within the annular portion 32; and a ring-like clampable band 37 is tightly clamped about the portion 32 close to the end wall of the kiln.

The feeding means 33—34, as here shown, comprises a screw feeder 33 and gas tight "star" feeder 34. The screw feeder comprises the cylindrical shell 38 within which is the rotatable feed screw 33, the shaft 39 of which is passed, with a suitable stuffing box $38^a$, air-tight through the end of the shell 38 for connection with a suitable mechanical driving means as an electric motor (not shown). The "star" feeder comprises the "star" 34 rotatably mounted gas tight in the cylindrical portion 40 of the casing 41. The "star" is made up of the blades 42 radiating from the shaft 43, the blades extending close to the casing and being substantially the length of the cylindrical portion 40. The end of the shaft 43 projects from the casing for suitable connection with a mechanical driving means, as an electric motor (not shown). The shell 38 of the screw feeder, and the lower end of the casing 41 of the star feeder, are in substantially air-tight connection as shown whereby the star feeder discharges the lithopone to the screw feeder. A screw feeder with a filling opening directly open to the air is not desirable, while a star feeder cannot readily be directly connected with the rotating kiln. The present arrangement permits the use of the star feeder (with its air-excluding advantages) in combination with the kiln, since it, while obviating the disadvantages of a screw feeder with a directly-open filling opening, utilizes the longitudinal-feed advantage of such a feeder to properly correlate the star feeder and the rotating kiln. Desirably the two feeders are driven synchronously and continuously, giving the desired continuous air-excluding feed to the kiln.

The dust collector 35 may be of any desired type being shown merely as a boxlike structure in open communication with the flue 36—32—7 and having a clean out door 44 at its bottom.

The kiln 1 comprises a steel shell 45 lined with fire brick 46. It is rotatably supported at each end by a race of radial rollers 47 and at its upper (right-hand) end the race flange 48, on the kiln, is received between thrust rollers 49, 49. Conveniently the kiln is driven by an electric motor 50 geared to the kiln as indicated at 51.

Such pyrometer connections as 52, 52, 52, as desired may be provided, for observing the temperatures. The air and gas supply to the burners may be controlled by any desired construction exemplified conventionally by the air valves 53 and gas valves 54, the detailed construction of the burners forming no part of the present invention. For determining the composition of the gases within the kiln, more particularly the amount of carbon monoxide present, a carbon monoxide recorder indicated conventionally at 55 may be used; or if preferred, a gas escape, for example, in the structure 2, and in the character of a burner may be used, burning of the escaping gas of course indicating carbon monoxide, and so on. If desired, automatic control of the air and gas supplies, waste gas circulation etc., and dependent on the temperature and carbon-monoxide-content changes may be used. Of course, the kiln may be driven in synchronism with the screw and star feeder.

I claim:

1. The process of calcining lithopone which comprises directly heating the same in a chamber with a gas free from oxygen and pre-heated before introduction into said chamber to a temperature above 600° C.

2. The process of calcining lithopone which comprises directly heating the same in a chamber with a gas having a reducing action and pre-heated before introduction into said chamber to a temperature above 600° C.

3. The process of calcining lithopone which comprises heating the same by direct exposure to a highly pre-heated reducing atmosphere containing between substantially ½ to 1½% of carbon monoxide, said pre-heating being above 600° C.

4. The process of calcining lithopone which comprises feeding the same in a substantially continuous stream and, at the same time, agitating the same and heating the same by an oppositely flowing contacting stream of highly pre-heated gas substantially free from free oxygen, said preheating being above 600° C.

5. The process of calcining lithopone which comprises exposing the same in a chamber closed against access of air except for provisions for gas heating, burning gas within said chamber and without excess of oxygen, and directing the highly heated combustion gases into contact with the lithopone to heat the same.

6. The process of calcining lithopone which comprises exposing the same in a chamber closed against access of air except for provisions for gas heating, burning gas within said chamber and without excess of oxygen, directing the highly heated combustion gases into contact with the lithopone to heat the same and agitating the lithopone during the heating.

7. The process of calcining lithopone which comprises exposing the same in a chamber closed against access of air except for provisions for gas heating, burning gas within said chamber and without excess of oxygen, and directing the highly heated combustion gases into contact with the lithopone to heat the same; while circulating cooling gas free from oxygen through the chamber.

8. The method of calcining lithopone, which comprises heating the lithopone by passing therethrough and in contact therewith a non-reactive gas heated to a temperature approximating the temperature at which it is desired to calcine the lithopone whereby there is imparted to the lithopone in large part at least the heat required to raise the lithopone to the desired calcining temperature.

9. The method of calcining lithopone which comprises heating the lithopone by passing therethrough and in contact therewith a heated non-reactive gas whereby there is imparted to the lithopone in large part at least the heat required to raise the lithopone to the desired calcining temperature.

10. The method of calcining lithopone, which comprises heating the lithopone by passing therethrough and in contact therewith a non-reactive gas heated to a temperature in excess of the temperature at which it is desired to calcine the lithopone whereby there is imparted to the lithopone substantially all of the heat required to raise the lithopone to the desired calcining temperature.

11. The method of calcining lithopone, which comprises heating the lithopone, in large part at least, by passing therethrough and in contact therewith a non-reactive gas and thereby establishing and maintaining a non-reactive environment about the lithopone, said non-reactive gas being introduced into the lithopone at a temperature approximating the temperature at which it is desired to calcine the lithopone.

12. The method of calcining lithopone, which comprises progressively passing the lithopone through a non-reactive environment, and introducing into the lithopone and passing therethrough and in contact therewith during the passage of the lithopone through said environment a heated non-reactive gas whereby there is imparted to the lithopone in large part at least the heat required to raise the lithopone to the desired calcining temperature.

13. The method of calcining lithopone, which comprises progressively passing the lithopone through a non-reactive environment, and introducing into the lithopone and passing therethrough and in contact therewith during the passage of the lithopone through said environment a non-reactive gas, said non-reactive gas being introduced into the lithopone at a temperature approximating the temperature at which it is desired to calcine the lithopone and in such quantity that there is imparted to the lithopone in large part at least the heat required to raise the lithopone to the desired calcining temperature.

14. The method of calcining lithopone, which comprises introducing into the lithopone and passing therethrough and in contact therewith a non-reactive gas, said non-reactive gas being introduced into the lithopone at a temperature approximating the temperature at which it is desired to calcine the lithopone and in such quantity that there is imparted to the lithopone in large part at least the heat required to raise the lithopone to the desired calcining temperature.

15. In the art of making lithopone, the process comprising, calcining the raw product in the presence of a calcining agent which will prevent oxidation of the product.

16. In the art of making lithopone, the process comprising, calcining the raw product by the direct action of non-oxidizing products of combustion therein in order to avoid oxidation of the product.

17. In the art of making lithopone, the process comprising, calcining the raw product by the direct action of a non-oxidizing calcining agent, and while the product is being agitated.

18. In the process of calcining lithopone by direct exposure thereof to highly heated gases, the steps which comprise burning a combustible gas in a space in open communication with a calcining zone, and then causing the hot combustion gases to contact with, and heat, the lithopone in said calcining zone.

19. In the process of calcining lithopone by direct exposure thereof to highly heated gases, the steps which comprise burning, in a space directly communicating with a calcining zone, a combustible gas with no more than the proportion of oxygen required to effect efficient combustion of said gas, and then bringing the hot combustion products into contact with the lithopone in said calcining zone.

20. A process as defined in claim 18 in which the hot combustion gases have their temperature reduced by mixing therewith a relatively cool gas substantially free of oxygen.

In testimony whereof I affix my signature.

WILLIAM J. LINDSAY.